United States Patent
Porter et al.

(10) Patent No.: US 12,023,603 B2
(45) Date of Patent: Jul. 2, 2024

(54) TWO-ELECTRODE CONFIGURATION FOR SEPARATIONS BASED ON ELECTROSORPTION IN ELECTROCHEMICALLY MODULATED LIQUID CHROMATOGRAPHY (EMLC)

(71) Applicant: University of Utah Research Foundation, Salt Lake City, UT (US)

(72) Inventors: Marc David Porter, Cottonwood Heights, UT (US); Robert Joseph Soto, Thousand Oak, CA (US); Mark Andrew Hayes, Gilbert, AZ (US)

(73) Assignee: University of Utah Research Foundation, Salt Lake City, UT (US)

( * ) Notice: Subject to any disclaimer, the term of this patent is extended or adjusted under 35 U.S.C. 154(b) by 867 days.

(21) Appl. No.: 17/026,177

(22) Filed: Sep. 19, 2020

(65) Prior Publication Data
US 2021/0086102 A1    Mar. 25, 2021

Related U.S. Application Data

(60) Provisional application No. 62/902,530, filed on Sep. 19, 2019.

(51) Int. Cl.
*B01D 15/38* (2006.01)
*B01D 15/22* (2006.01)
*G01N 30/02* (2006.01)
*G01N 30/60* (2006.01)

(52) U.S. Cl.
CPC ......... *B01D 15/3885* (2013.01); *B01D 15/22* (2013.01); *G01N 30/6052* (2013.01); *G01N 2030/027* (2013.01)

(58) Field of Classification Search
CPC ............... B01D 15/22; B01D 15/3885; G01N 30/6052; G01N 2030/027
See application file for complete search history.

(56) References Cited

U.S. PATENT DOCUMENTS

2013/0129920 A1*  5/2013  Dai ..................... C01B 32/00
                                                                      427/227
2017/0097326 A1*  4/2017  Liu ...................... G01N 30/56

FOREIGN PATENT DOCUMENTS

WO          WO 89/07265      *  8/1989

OTHER PUBLICATIONS

J.A. Harnisch, Electrochemically modulated liquid chromatography: an electrochemical strategy for manipulating chromatographic retention, Analyst, 2001(126), p. 1841-49. (Year: 2001).*

(Continued)

*Primary Examiner* — C. M. Sun
(74) *Attorney, Agent, or Firm* — Thorpe North & Western, LLP

(57) ABSTRACT

This invention discloses a design a capillary column for use with electrochemically modulated liquid chromatography (EMLC). The capillary design, which results in a marked reduction in the flow of current through the column, enables the use of a two-electrode column construction that overcomes the mechanical and electrical shortfalls of the conventional standard bore design.

12 Claims, 7 Drawing Sheets

(56) References Cited

OTHER PUBLICATIONS

B.J. Yakes, Electrochemically modulated liquid chromatographic separation of triazines and the effect of pH on retention, Journal of Chromatography A, 2010(1217), p. 4395-4401. (Year: 2010).*

H. Deng, Electrochemically modulated liquid chromatography coupled on-line with electrospray mass spectrometry, Anal. Chem. 2000(72), p. 2641-47. (Year: 2000).*

Authors: Robert J. Soto, Mark A. Hayes, and Marc D. Porter Title: Electrochemically Modulated Liquid Chromatography in Fused Silica Capillary Columns Publication: Analytical Chemistry (Anal. Chem.) Publisher: American Chemical Society, Washington DC, USA.

Authors: Juanjuan Feng, Min Suna, Jubai Li, Xia Liu, Shengxiang Jiang, Title: A novel silver-coated solid-phase microextraction metal fiber based on electroless plating technique Publication: Analytical Chimica Acta (Anal. Chim. Acta) Publisher: Elsevier Publishing Company, Amsterdam, Netherlands vol. 701, pp. 174-180, Year: 2011.

Authors: Blanca H. Lapizco-Encinas and Neville G. Pinto Title: On the potential of electrochemically modulated liquid chromatography of proteins in a micro open parallel plate separator Publication: Journal of Separation Science (J. Sep. Sci.) Publisher: Wiley-VCH, Weinheim, Germany.

Authors: D.A. Barrow, O.K. Castell, N. Sykes, P. Myers, and H. Ritchie Title: A microfabricated graphitic carbon column for high performance liquid chromatography Publication: Journal of Chromatography A (J. Chromatogr. A) Publisher: Elsevier Publishing Company, Amsterdam, Netherlands.

\* cited by examiner

TWO-ELECTRODE CONFIGURATION FOR SEPARATIONS BASED ON ELECTROSORPTION IN ELECTROCHEMICALLY MODULATED LIQUID CHROMATOGRAPHY (EMLC)

REFERENCE TO RELATED APPLICATION

This application claims inventions disclosed in Provisional Patent Application No. 62/902,530, filed Sep. 19, 2019, entitled "TWO-ELECTRODE CONFIGURATION FOR SEPARATIONS BASED ON ELECTROSORPTION PHENOMENON FOR ELECTROCHEMICALLY MODULATED LIQUID CHROMATOGRAPHY (EMLC)." The benefit under 35 USC § 119(e) of the above-mentioned United States Provisional Application is hereby claimed, and the aforementioned application is hereby incorporated herein by reference.

FIELD OF INVENTION

This invention relates to the design of a capillary EMLC column that has an internal diameter (ID) much smaller than that of the standard-bore predecessor columns.

BACKGROUND

High-performance liquid chromatography (HPLC) is among the most used analytical techniques in the analysis and purification of complex samples. HPLC takes advantage of the physical and chemical interactions of an analyte with both mobile and stationary phases to separate a wide range of analytes, including charged and uncharged molecules, enantiomers, proteins and other complex biomolecules, viruses, and bacteria. The utility of HPLC across these broad classes of analytes is partially due to the dynamic tunability of the mobile phase composition through strategies such as gradient elution. Indeed, careful optimization of these parameters is routinely performed to enhance resolution between species and decrease the overall separation time. Equally important, diverse stationary phases exist that facilitate the separation through the differential on-column retention of species based, for example, on hydrophobicity/hydrophilicity (e.g., normal and reverse-phase HPLC, hydrophilic interaction LC) and molecular weight (size-exclusion) chromatography).

Electrochemically modulated liquid chromatography (EMLC), on the other hand, works by altering solute retention through changes in the electrical potential applied ($E_{app}$) to a conductive stationary phase [e.g., porous graphitic carbon (PGC)]. The stationary phase can therefore be viewed as a compositionally tunable material with retention characteristics that can be adjusted to enhance the efficiency of separation both prior to as well as during the elution process. An EMLC column is constructed by fashioning an LC column into an electrochemical cell whereby the electrical potential of the stationary phase, relative to a suitable reference electrode, is controlled, for example, by a potentiostat. For most of the EMLC column designs to date, a standard-bore design (e.g., 3.3 mm column ID) was used. Due to the relatively large stationary phase surface area in the standard-bore configuration, a three-electrode arrangement (i.e., working, reference, and counter electrodes) was required to support the large Faradaic background currents and accurately control the potential applied to the stationary phase. These designs, however, were prone to short-circuiting and suffered from poor chromatographic efficiency.

This invention disclosure shows that the development of the capillary EMLC column (e.g., 250 μm ID) results in a construct with a sufficient drop in current flow to enable the use of a two-electrode configuration. As a result, the current can be carried by the reference electrode without altering is reference potential. This eliminates the need to carry the current flow through a counter electrode. This new EMLC column configuration results in a much-needed improvement in the robustness of the system and in chromatographic separation efficiencies, which now rival those of many of today's HPLC systems.

SUMMARY OF THE INVENTION

This invention details the design of a capillary column for use with electrochemically modulated liquid chromatography (EMLC). There are several challenges inherent to the functional operation of an EMLC column. These challenges reflect the need to effectively incorporate and electrically isolate a number of electrochemical components (e.g., working and reference electrodes, fittings, and electrical contacts) into the design of an EMLC in a manner that does not diminish chromatographic performance. This capillary column design utilizes a capillary tube that is packed with a conductive stationary phase that also acts as the working electrode in an electrochemical cell. The small internal volume of the capillary reduces the total surface area of stationary packing in the column. This, in turn, results in a marked decrease in the current that flows through the column, enabling the use of a two-electrode column construction in which the levels of current flow do not cause instability in the reference electrode potential. This two-electrode design also overcomes the mechanical and electrical shortfalls of EMLC column designs that use conventional standard bore sized columns, providing a separation tool that can be exploited to direct improvements in separation efficiency by dynamically altering the effective composition of the stationary phase through changes in the potential applied to a conductive stationary phase.

BRIEF DESCRIPTION OF THE FIGURES

The accompanying figures, when linked with the detailed descriptions that follow, serve to illustrate various embodiments of the invention, which aid in framing the operational principles and associated advantages of the invention.

DETAILED DESCRIPTION

Figure 1:
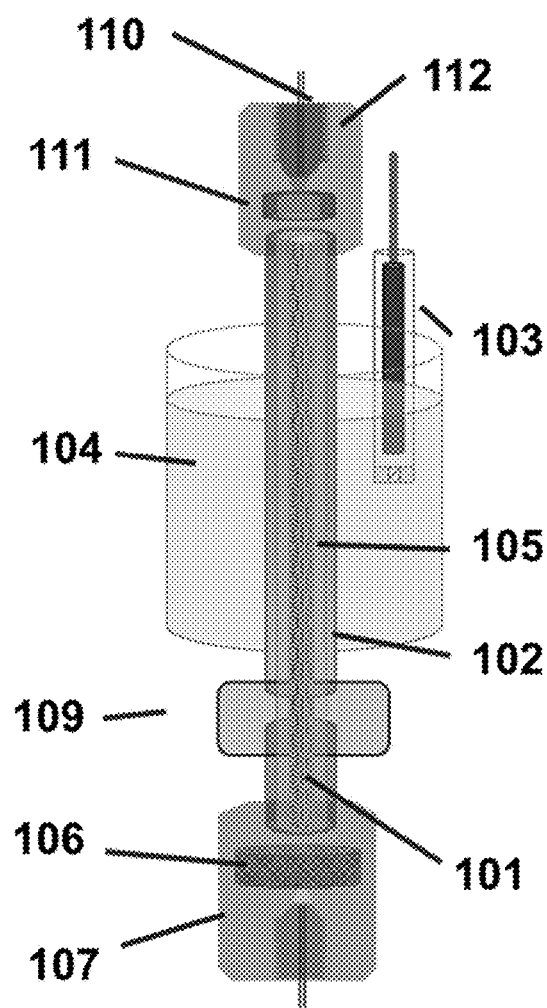
FIG. 1 is a schematic illustration of a standard bore EMLC column.

By way of context, the embodiments of the present invention are described within the framework of analytical- and preparative-scale separations by electrochemically modulated liquid chromatography (EMLC) It should, however, be readily recognized by practitioners skilled in the art that these embodiments apply well beyond this illustrative example to include the use of this invention across all areas of investigative and applied measurement science and technology.

Note that relational terms such as "first" and "second," "top" and "bottom", and the like may be used solely to distinguish one entity or action from another entity or action without necessarily requiring or implying an actual relationship or order between such entities or actions. The terms "comprises," "comprising," or any variations thereof, are intended to cover a non-exclusive inclusion such that a process, method, article, or apparatus that consists of a number of different and/or related elements is not limited to only those elements but may include other elements not expressly listed or inherent to such a process, method, article, or apparatus. An element preceded by "comprises" does not, without more constraints, preclude the existence of a number of additional identical elements in the process, method, article, or apparatus that comprises the element.

Electrochemically modulated liquid chromatography (EMLC) is a separation technique that merges liquid chromatography (LC) and electrochemistry. In EMLC, an electrically conductive stationary phase like porous graphitic carbon (PGC) also serves as the working electrode in a three-electrode electrochemical cell. This design enables the manipulation of the interfacial properties of the stationary phase (e.g., the structure of the electrical double layer) by the application of fixed electrical potentials ($E_{app}$) or potential waveforms by means of an external potentiostat. These changes can alter analyte retention and, in some cases, the order of analyte elution. EMLC, therefore, differs from all other known forms of liquid chromatography (e.g., reversed-phase LC) in that the stationary phase may be altered prior to or during a separation via an externally controlling the value of $E_{app}$.

Despite the potential utility of EMLC as a separation technique, there are two challenges that have limited its widespread adoption. Both are related to configuring an LC column to, at the same time, function as an electrochemical cell: (1) the availability of materials suitable as conductive stationary phases and (2) the engineering design and operation of the column itself. Stationary phases for EMLC must have the same characteristics shown to be important to conventional LC (i.e., homogeneous in size and surface chemistry, chemical and mechanical stability, and a high surface area). These stationary phases must also be electrically conductive. Carbonaceous materials (e.g., reticulated vitreous carbon, boron-doped diamond, glassy carbon, and PGC) and a number of other conductive materials meet these requirements, noting that the majority of the work to date on EMLC has used PGC as the stationary phase material.

In addition to the characteristics of the stationary phase, there are several challenges inherent to the functional operation of an EMLC column. These challenges reflect the need to effectively incorporate a number of electrochemical components (e.g., reference and counter electrodes, insulating membranes and fittings, and electrical contacts) into the design of an EMLC in a manner that does not diminish chromatographic performance.

FIG. 1 summarizes the common features of earlier EMLC column designs, all of which followed the layout of a conventional three-electrode (i.e., working, reference, and counter electrodes) electrochemical cell. In this example, a PGC stationary phase (101) is carefully packed inside a porous stainless-steel tube (102), which acts as a column housing and as a counter electrode, and a silver-silver chloride (Ag|AgCl) reference electrode (103) is placed in an external electrolyte bath (104) that contains an electrolyte solution in contact with the porous stainless-steel counter electrode. The counter electrode and PGC are separated by a perfluoro sulfonated ion-exchange membrane (105). The ion exchange tubing tightly conforms to the inner wall of the stainless-steel tube, acting to electrically isolate the working electrode from the counter electrode while also facilitating ion transport between electrodes. A stainless-steel retaining frit (106) makes conformal contact with both the PGC and a metallic end-fitting (107). The metallic end-fitting serves as the electrical connection to the working electrode and a connector at the liquid inlet (108) to the tubing from the chromatographic pumping system. The insulating polyether ether ketone union (PEEK) (109) electrically separates the stationary phase from the counter electrode (102). The stationary phase is further separated from the counter electrode just below the column inlet (110) by an insulating polymer frit (111), which is connected to the column by another metallic end-fitting (112). A section of tubing comprised of an ion-exchange polymer (105) serves to separate the stationary phase and column housing along the length of the column, thereby preventing electrical short-circuit.

While the design of the EMLC column has proven its utility in the past, the ion exchange tubing can deform under the pressures applied to drive fluid flow through the column, which can compromise run-to-run repeatability and broaden the profiles of the elution bands. The ion exchange tubing can also rupture to cause an electrical short circuit between the PGC and counter electrode and, consequently, column failure.

Figure 2:
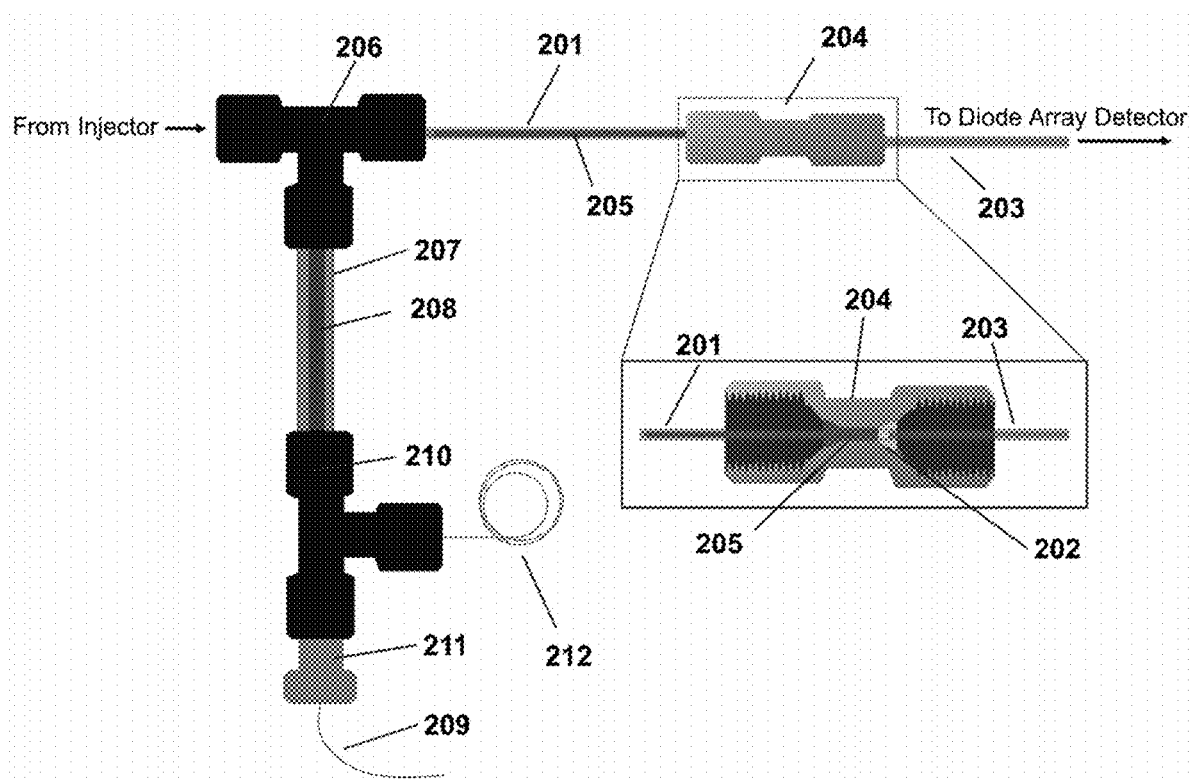
FIG. 2 is a configurational diagram for capillary EMLC system.

This invention discloses a column design, exemplified in FIG. 2, which is aimed at improving the instrumental capabilities of EMLC by the construction of a miniaturized, two-electrode capillary system. In this example, the inner diameter (ID) of the column from 3.3 mm, an ID reflective of standard-bore HPLC columns, to 250 μm ID by using fused silica tubing as the column housing and a conductive stationary phase for chromatographic separations. Note that the conductive stationary phase is packed directly into the silica capillary column and acts as both the working electrode in a two-electrode electrochemical cell and as the stationary phase for chromatographic separations. Due, in part, to the lower surface area of the stationary phase, the reference electrode can carry the current that flows in the cell and maintain a stable (i.e., usable) reference potential. As a result, the counter electrode and ion exchange membrane are eliminated from the column design.

It is well known that capillary columns can maintain the efficiency of their larger-bore counterparts and provide additional benefits such as increased sensitivity, reduced amounts of stationary phase needed to pack columns, significantly decreased solvent consumption, and lower required sample volumes. There are two more uniquely distinct benefits to the adaptation of EMLC to capillary columns: (1) the design and placement of the individual electrodes are simplified, and (2) the ion exchange tubing is eliminated from the column design. Collectively, the design and chromatographic performance benefits of the new capillary EMLC hardware developed herein may encourage the more widespread study and use of this technique.

The design of the new column is exemplified in FIG. 2. It is constructed by cutting a polyimide-coated fused silica tubing (201) packed with a conductive stationary phase like PGC [360 μm outer diameter (OD), with either a 100 or 250 μm inner diameter (ID)] to a length of 25-30 cm. A glass fiber/silica composite retaining frit (202) was installed in a separate ~5 cm piece of 250 μm ID tubing (203). After installation of the frit, both the column and fritted tubing were connected via a stainless-steel union (204) with a 250 μm diameter thru-hole. By orienting the two pieces of tubing in this way, a stationary phase such as PGC (205) is then slurry packed into the thru-hole (250 μm diameter) of the union, thereby establishing conformal and electrical contact between the PGC packing and stainless-steel union. Note that electrical contact is maintained under the high fluid pressures operative in LC, meaning the union can be used as the electrical contact between the working electrode and potentiostat without increasing column backpressure or degrading chromatographic efficiency.

The column was connected to a conventional HPLC instrument by way of a 6-port injection valve that used a 90 nL loop (not shown) prepared from a length of 50 μm ID polymer tubing and a standard 500 nL flow cell for detection by UV-Vis absorbance measurements. The flow path of liquid from the LC system was modified to accommodate the low rate of fluid flow through the capillary EMLC column by using a pre-column flow splitter (206) connected to a piece of polymer tubing (207) that was used to house the pseudo-reference electrode (208). There are three key elements of this design. It (1) places the pseudo-reference electrode in close proximity to the PGC stationary phase, which minimizes the uncompensated resistance in the electrochemical cell; (2) can withstand pressures up to 400 bar operative in the LC experiments; and (3) prevents the mobile phase from contacting wire leads used to make electrical contact with the pseudo-reference electrode.

As an example, the flow splitter and pseudo-reference electrode housing can be assembled by soldering one end of a 10 cm long, 0.4 mm diameter chloridized silver wire (Ag|AgCl electrode; 208) to a ~50 μm diameter tungsten wire (209). The tungsten wire functions as an electrical lead for connection between the reference electrode and potentiostat. The solder junction is then inserted into a ~5 cm piece of 1 mm ID polyether ether ketone (PEEK) tubing and sealed with a heat-curable epoxied glue (not shown). The PEEK tubing was connected to one free thread of a PEEK tee-union (210) with the Ag|AgCl wire inserted through the thru-hole of the tee-union. The remaining length of the Ag|AgCl wire (~7 cm) that protruded from the tee-union was sheathed with a piece of 0.5 mm ID PEEK tubing. The next step connects the PEEK tubing to the tee-union (i.e., the thread where the Ag|AgCl wire exits the union) on one end and to the pre-column flow splitter union on the other end by means of a 1/16" PEEK LC fittings (211). Finally, the free thread of the tee-union is connected to a 60 cm length of 50 μm ID PEEK tubing (212), which places the 50 μm ID tubing in line with the Ag|AgCl wire to provide the necessary flow resistance to achieve the desired mobile phase flow rate through the column.

After completing the column packing procedure, the column and connecting tubing (i.e., the segment containing the frit) were connected to the LC system and flushed with the mobile phase at a back pressure of 120 bar for several hours. The mobile phase was 4% acetonitrile:96% water containing 0.10 M LiClO$_4$ and 0.15 M LiCl. Backpressures during the operation were typically ~140 bar. After applying a potential to the PGC, the background current was allowed to decay to an approximately constant background prior to analyte injection. This process generally required 20-30 min; however, up to 40 min was required for the current to stabilize at more extreme potentials (i.e., +400 or −800 mV $E_{app}$) due to the larger magnitude of the background current. Note that application of an electrical potential to the PGC (−0.8 to +0.5 V vs Ag|AgCl, sat'd KCl) in the 3.3 mm standard-bore column generally results in a significant double-layer charging current of a few milliamps or more, which stabilizes after 20-60 min to nonzero current levels of 0.5-10 μA. These significant background currents, which arise from faradaic reactions of O$_2$ or electrolyte contaminants in the mobile phase, necessitate the use of a counter electrode to ensure the stability of the reference electrode potential. In comparison, background currents for the capillary configurations were typically on the order of a few nanoamperes.

Figure 3:
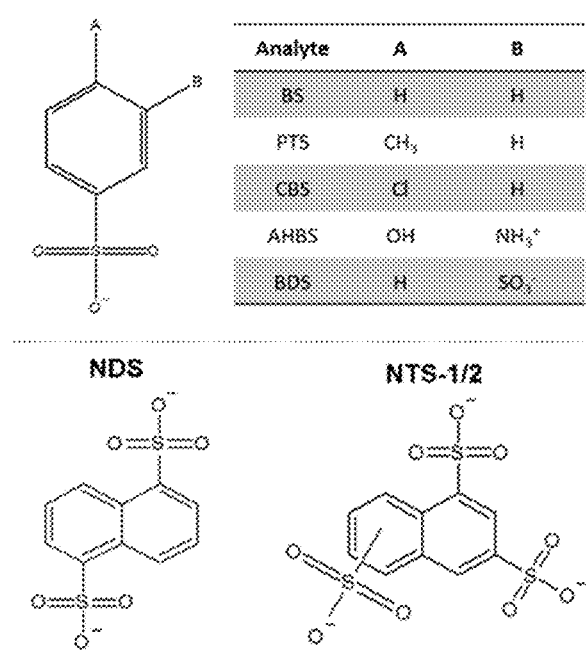
FIG. 3 presents the chemical structures of the aromatic sulfonates use to access the improvements in chromatographic performance.
Figures 4A, 4B, 4C, 4D:
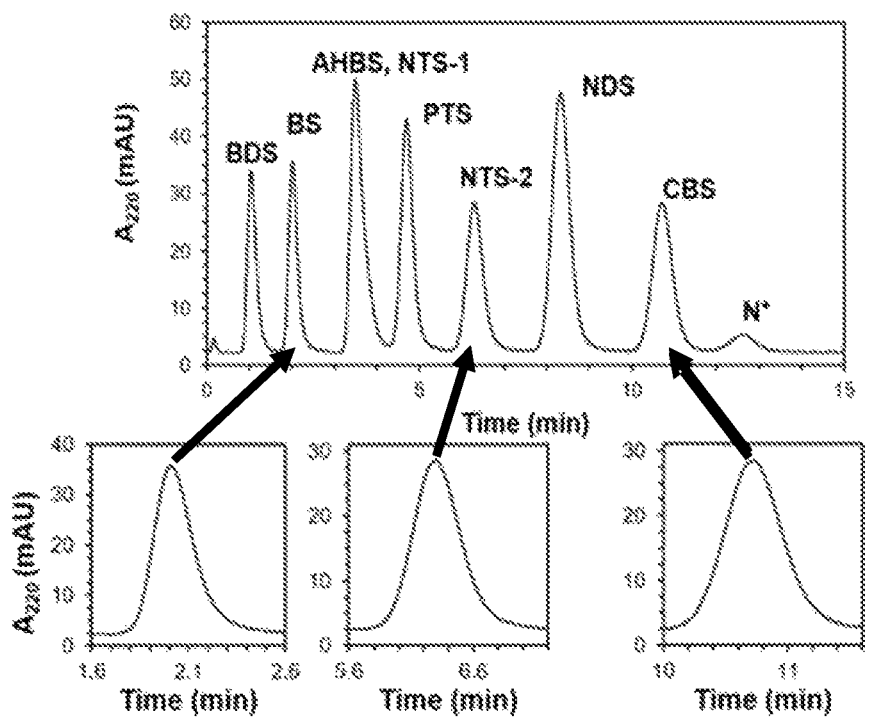
FIG. 4A shows a chromatogram collected on a 250 μm ID EMLC column at open circuit potential (~−50 mV vs. Ag|AgCl pseudo-reference electrode) for the sample mixture prepared with the compounds listed FIG. 3.
FIG. 4B shows a zoomed-in profile for the elution band for the early-eluting analyte BS from FIG. 4A.
FIG. 4C shows a zoomed-in profile for the elution band for the moderately-eluting analyte NTS-2 from FIG. 4A.
FIG. 4D shows a zoomed-in profile for the elution band for the late-eluting analyte CBS from FIG. 4A.
Figure 5:
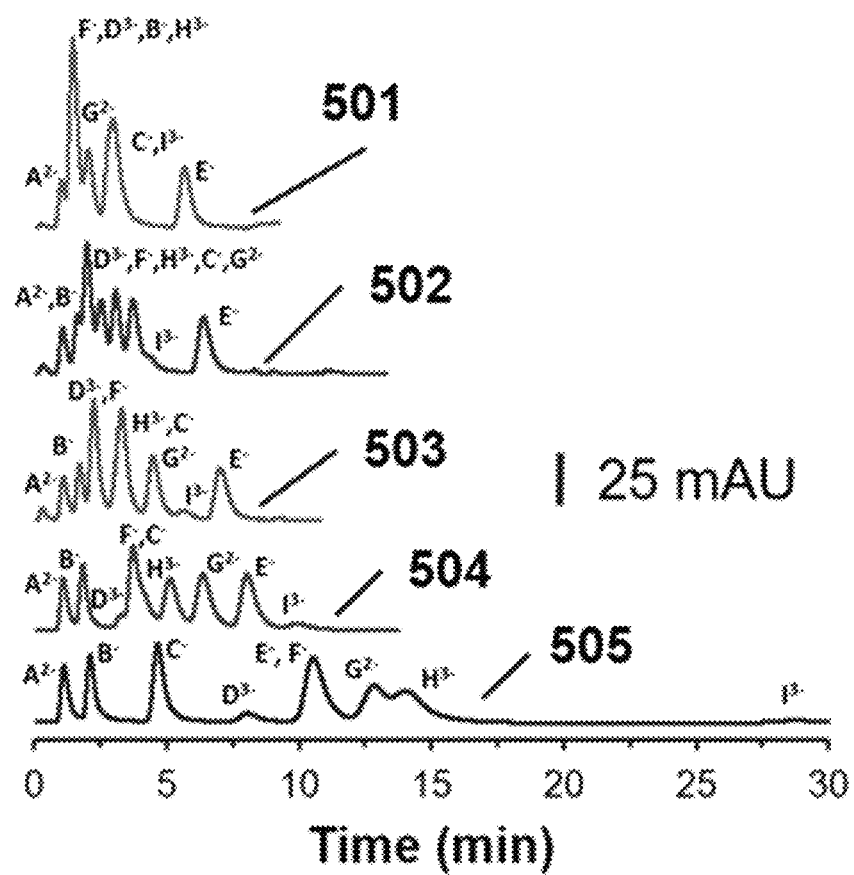
FIG. 5 shows chromatograms collected on a 250 μm ID EMLC column at different $E_{app}$ (vs. Ag|AgCl pseudo-reference electrode)
Figure 6:
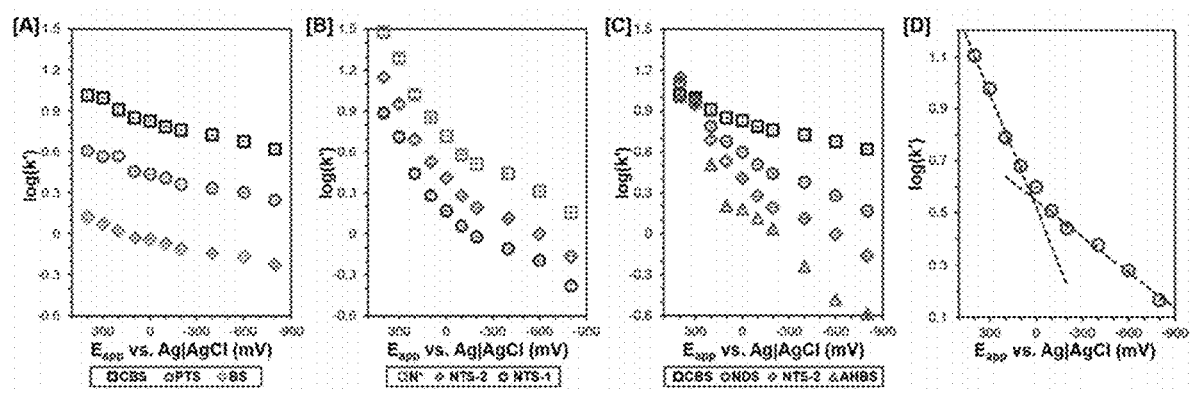
FIG. 6 plots of log(k') vs. $E_{app}$ for separations of [A] the monovalent (−1) analytes: CBS, PTS, and BS; [B] the trivalent (−3) analytes: NTS-1, NTS-2, and N*; and [C] analytes with different coulombic charges: NTS-2 (−3), NDS (−2), CBS (−1) and AHBS.

The improvements in the chromatographic performance of the capillary design were demonstrated by using mixtures of the compounds shown in FIG. 3 by means of the chromatographic data presented in FIGS. 4-6. The concentrations were 4 (NDS), 7.5 (AHBS, BDS, BS, CBS, PTS), or 15 (NTS) μg/mL, resulting in 0.36-1.35 ng injection masses for each analyte. In these experiments, the eluents were detected via UV-VIS absorbance spectroscopy with a diode array detector. Absorbance spectra were collected for every data point (sampling frequency of 1 Hz), which aided in peak identification based on characteristic absorption bands for each analyte. Unless specified otherwise, all chromatograms were generated by monitoring the absorbance at 220 nm. For peak identification, single analyte injections—or, in some cases, injections of well-resolved pairs of analytes— were used in conjunction with UV-Vis absorbance spectra to identify the elution bands in the chromatogram for the eight-component mixture and for precise determination of retention times.

Eight aromatic sulfonates were chosen for column characterization because the retention behavior of these analytes on PGC with respect to $E_{app}$ has been well characterized.[5,12] Five unsubstituted aromatic sulfonates (i.e., BS, BDS, NDS, NTS-1, and NTS-2) with different coulombic charges (−1 to −3) and fused ring structures (benzene and naphthalene) were used to investigate the impact of electrostatic and π interactions on retention as a function of $E_{app}$. Benzenesulfonate derivatives with electron withdrawing (—Cl, —NH$_3^+$) or donating (—CH$_3$, —OH) substituents were included in the test mixture to assess other noncovalent interactions (e.g., dispersive and dipole-dipole). Additionally, AHBS exhibits redox behavior on graphitic carbon at low potentials (−70 to 0 mV vs Ag|AgCl, sat'd KCl) and was suspected of displaying unique retention behavior as a function of $E_{app}$.

The performance of the capillary EMLC column was quantified by several different separation parameters, including the retention factor (k'), the elution band asymmetry factor ($A_s$), the number of theoretical plates (N), and the chromatographic resolution ($R_s$). The retention factor, k, for each an analyte under a set of chromatographic conditions specified shortly, was calculated according to Eqn 1, $$k' = \frac{t_R - t_M}{t_M} \quad (1)$$

where $t_R$ is the unadjusted retention time of the analyte, and $t_M$ is the dead time of the column. The higher the value of k', the stronger the affinity of an analyte for the stationary phase.

The asymmetry factor, $A_s$, which is an indicator of elution band tailing, was calculated according to Eqn 2, $$A_s = \frac{b}{a} \quad (2)$$

where a is the half widths of an analyte's elution band at 10% of its peak height toward the leading edge of the band and b is the half widths of an analyte's elution band at 10% of its peak height toward the trailing edge of the band. Values of $A_s$ greater than 1 indicate peak tailing, and values of $A_s$ less than 1 are diagnostic of fronting.

The number of theoretical plates, N, was used as a measure of column efficiency and was calculated using Eqn 3, $$N = 5.54\left(\frac{t_R^2}{W_{0.5}^2}\right) \quad (3)$$

where $W_{0.5}$ is the full width of the elution band determined at half of its maximum peak height.

The efficiency of a separation can also be determined by the chromatographic resolution, $R_s$, which is given in Eqn 4.

$$R_s = \frac{2(t_{R2} - t_{R1})}{w_{b1} + w_{b2}} \quad (4)$$

In Eqn 4, the subscripts 1 and 2 represent elution metrics for a pair of solutes that elute neighbor each other whereby the subscript 1 is for the more weakly retained solute, and the subscript 2 is for the more strongly interacting solutes. The parameter $t_{Ri}$ represents their corresponding unadjusted retention times, and $w_{bi}$ stands for the widths at the base of each of the elution bands. $R_s$, therefore, take both the column efficiency and the difference in solute retention into account.

FIG. 4A presents a chromatogram for the separation of the eight-component mixture on a 140×0.25 mm (length×ID) EMLC column at open circuit potential (−50 mV vs. Ag|AgCl pseudo-reference electrode), whereas FIGS. 4B-D shows the elution bands for three of the components, BS, NTS-2, and CBS, in the mixture in order to more clearly demonstrate the improvements in performance. This separation was carried out at a flow rate of 10.6±0.2 µL/min. As shown in FIG. 4, six of the eight components in the mixture were well resolved from each other, but AHBS and NTS-1 coeluted at with retention times spanning 3-4 min. An unknown ninth band eluted at 12.65 min. This band was subsequently identified as a naphthalene-based contaminant in the isomeric 1,3,6/7-naphthalenetrisulfonic acid stock and is hereafter abbreviated N*.

For the chromatogram shown in FIG. 4, the theoretical number of plates, N, for moderately retained analytes (2<k'<10) and a dead-time marker (i.e., BDS) were calculated at 13,200-19,500 and 3,400 plates/m, respectively. Values for N up to 39,600 plates/m were achieved at lower, more optimal flow rates (e.g., 0.2 µL/min; data not shown as the elution times for such separations span several hours). Importantly, these efficiencies meet or exceed the typical efficiencies (i.e., 2,000-5,000 plates/m) reported for the column design illustrated in FIG. 1, as well as the largest efficiency (14,000 plates/m) reported for the standard-bore configuration to date.

The chromatograms in FIG. 4 also demonstrate an improved symmetry in elution band profiles. As shown in FIGS. 4B-D, the elution bands for the three different solutes with the capillary EMLC column have little tailing and become increasingly symmetric for the analytes that are strongly retained on the column. Moreover, the asymmetry factor, $A_s$, for BS, which has a retention time, $t_R$, of 2.02 min, is 1.4 that is diagnostic of moderate tailing. As noted, however, the symmetry of the elution bands clearly improves as the value of $A_s$ decrease to 1.2 and 1.1 for NTS-2 ($t_R$=6.33 min) and CBS ($t_R$=10.71 min), respectively. For comparison, data from the standard bore EMLC columns yields $A_s$ values ranging from 2.1 to 4.4, which are large and effectively unusable levels of tailing.

The dependence of the retention of the mixture's components as a function of different fixed values of $E_{app}$ is presented in FIG. 5. The set of chromatograms was obtained with a 120×0.25 mm PGC-packed capillary EMLC column at a flow rate of 8.4 (±0.2) µL/min (backpressure of 141 bar) for five different fixed values of $E_{app}$: −400 (501), −100 (502), 0 (503), +200 (504), and +400 (505) mV (vs. Ag|AgCl pseudo-reference electrode). Elution band assignments are abbreviated for clarity according to the following assignments: $A^{2-}$ (BDS), $B^-$ (BS), $C^-$ (PTS), $D^{3-}$ (NTS-1), $E^-$ (CBS), $F^-$ (AHBS), $G^{2-}$ (NDS), $H^{3-}$ (NTS-2), $I^{3-}$ (N*).

Application of −400 mV to the PGC packing resulted in the elution of eight of the mixture's nine components in ~4 min. The last component of the mixture, CBS, eluted with a $t_r$ of 5.65 min and was baseline resolved from all of the other components. At −100 and 0 mV—values of $E_{app}$ close to the open circuit potential of the column (−50 mV)—there are significant changes in the retention, k', of each analyte; there were also changes in the order of elution. Comparing the elution of the separations performed at −400 and 0 mV, the overall separation time increased from ~6.5 to 8.5 min. At 0 mV, five analytes (BDS, BS, N*, NDS, and CBS) are either moderately or effectively resolved (1.0<$R_s$<1.5) from all of the other components of the mixture, with AHBS and NTS-1 coeluting together and PTS and NTS-2 coeluting together. Relative to −400 mV, the k' values for the separations at 0 mV are larger, increase that was also accompanied with a few changes in elution order. NDS, for example, is more strongly retained than PTS at 0 mV. Increasing $E_{app}$ to more positive values further increases the retention of all of the components in the mixture. At the most positive $E_{app}$ tested (+400 mV), it takes ~33 min for all nine analytes to elute. For comparative purposes, the retention factors for all analytes increase, relative to their respective values at −400 mV, by a factor of at least 2× and up to 38×. Furthermore, five analytes (BDS, BS, PTS, N*, and NTS-1) are now baseline separated ($R_s$>1.5) from all of the other components in the mixture. On the other hand, NDS and NTS-2 are poorly separated ($R_s$=0.6), and CBS/AHBS coelute ($R_s$<0.5).

FIG. 6 summarizes the results of the retention data collected over fixed values of $E_{app}$ ranging from +400 mV to −800 mV by plots of log(k') versus $E_{app}$. As was evident from the chromatograms in FIG. 5, the retention for each of the 9 analytes decreases as the value of $E_{app}$ moved progressively negative. This dependence can be partially accounted for by electrostatic repulsion between the sulfonate moieties on the solutes and the negatively charged PGC surface. At a more detailed level, perspectives on how changes in $E_{app}$ alter retention can be developed by examining linear fits to the log(k') vs. $E_{app}$ plots in FIG. 6, which are summarized in Table 1. Note that BDS is not retained—it elutes with the injection peak—at all values of $E_{app}$ except for +400 mV and is not included in this analysis. In most instances, the retention behavior of the different aromatic sulfonates can be attributed to the magnitude of their electrostatic charge, meaning that the greater the charge on the analyte, the greater the dependence of its retention to changes in $E_{app}$. This perspective qualitatively matches the trends in the data listed in Table 1. More specifically, the slopes for the three monovalent anions (BS, PTS, and CBS) fall within the range of 0.42-0.52 $V^{-1}$, whereas those for NDS (−2 charge) and NTS-1/2 (−3 charge) are 1.31 and ~1.90 $V^{-1}$, respectively. The slope for N* (1.95) is also consistent with that of a trivalent anion, meaning it is likely to be an isomer of NTS-1/2.

TABLE 1

Slopes (S) of the log(k') vs. $E_{app}$ plots for the aromatic sulfonates.

| Analyte[a] | S at $E_{app}$ > 0 V ($V^{-1}$) | S at $E_{app}$ < −0.2 V ($V^{-1}$) |
|---|---|---|
| BS (−1) | 0.42 ± 0.04 (0.999)[c] | 0.18 ± 0.03 (0.932) |
| AHBS(0) | 2.42 ± 0.42 (0.923) | 1.05 ± 0.14 (0.965) |
| PTS (−1) | 0.46 ± 0.09 (0.889) | 0.19 ± 0.03 (0.957) |
| CBS (−1) | 0.52 ± 0.06 (0.954) | 0.23 ± 0.02 (0.987) |
| NDS (−2) | 1.31 ± 0.11 (0.991) | 0.46 ± 0.04 (0.986) |
| NTS-1 (−3) | 1.87 ± 0.15 (0.990) | 0.58 ± 0.09 (0.956) |
| NTS-2 (−3) | 1.90 ± 0.15 (0.993) | 0.58 ± 0.06 (0.978) |
| N*(−3)[b] | 1.95 ± 0.13 (0.992) | 0.60 ± 0.07 (0.976) |

[a]BDS eluted with the solvent front at most values of $E_{app}$ and was thus omitted from the Table.
[b]The coulombic charge for N* was inferred based on the slope of the log(k') vs. $E_{app}$ plot and the fact that N* is an impurity in the NTS-1/2 stock.
[c]$R^2$ values for the linear fits are in parenthesis.

It should be noted, however, that while coulombic charge can have a strong influence on retention upon changes in $E_{app}$, there are a number of other contributing factors that play a role in the interaction of these analytes and the PGC stationary phase. For example, the ratio of the slopes for NDS and BS, 3.12±0.39, is larger than that predicted based solely on the basis of electrical charge (i.e., 2). The same observation can be made for the trivalent analytes (e.g., $S_{NTS-2}$:$S_{BS}$=4.52±0.56). This results indicate that interactions between the π-system of the naphthalene ring and positively charged PGC surface also have an impact on retention, which is consistent with the high affinity of PGC for polarizable functional groups (i.e., phenyl and fused aromatic ring systems). In other words, the stronger dependence of retention at values above the potential of zero charge (PGC) for PGC (~−150 mV) reflects the attractive contributions of the electrostatics and π-π interactions of this system. On the other hand, the weaker dependencies of retention at values of $E_{app}$ below PGC's PZC are qualitatively consistent with the tradeoffs between the electrostatic repulsion of the negative charges analytes and the buildup of negative charge on the PGC surface and the attractive interactions of the two π-π systems.

There is one more point to draw out regarding the dependencies of analyte retention in FIG. 6D that warrants further discussion. FIG. 6D highlights the shift in retention behavior between −200 and 0 mV for NDS with the linear fits to the plots at two different potential ranges superimposed as dotted lines. AHBS, which being a zwitterion ion that is neutrally charged under the conditions used for these separations, has two dependencies not accounted for the above mechanistic descriptions. First, the retention dependence of AHBS to changes in $E_{app}$ was stronger than those found for any of the analytes tested (S=2.42 $V^{-1}$ at $E_{app}$>0 mV). Second, there was a slightly more abrupt sudden change in the slope of the log(k') vs. $E_{app}$ plot for AHBS at between 0 and +100 mV not observed in FIG. 6C for any of the other analytes. As a test for the possible electrochemical transformation of the analytes, the measured absorbance for each solute upon elution was compared to that to standards analyzed by spectrophotometry.

Importantly, the neutral (zwitterionic) AHBS exhibited two features not accounted for in the above mechanistic discussion. First, AHBS was more responsive to $E_{app}$ than any of the analytes tested (S=2.42 $V^{-1}$ at $E_{app}$>0 mV). Second, there was a sudden change in the slope of the log(k') vs. $E_{app}$ plot for AHBS at between 0 and +100 mV that was not observed for any of the other analytes (FIG. 6C). Because aromatic amines are known to undergo electrooxidation reactions at carbon electrodes, the possibility that such a process may account for the unique retention behavior of AHBS, a series of cyclic voltammetry experiments were carried out. These experiments using a glassy carbon electrode as a surrogate for the PGC stationary phase with AHBS dissolved in the EMLC mobile phase. The results of these experiments are presented in FIG. 7 [reference electrode: Ag|AgCl (sat'd KCl), counter electrode: Pt coil, scan rate: 100 mV/s]. Note that the arrow depicts the potential scan direction and that anodic currents are plotted as positively signed values.

Figure 7:
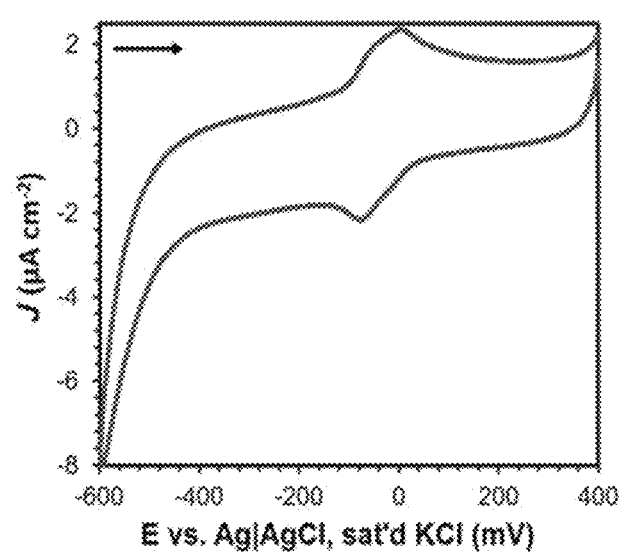
FIG. 7 shows a cyclic voltammogram for AHBS (235 μM) in a degassed EMLC mobile phase (0.1 M LiClO$_4$, 0.15 M LiCl, 4% acetonitrile.

The anodic trace in FIG. 7 (scan from −600 to +400 mV) has two waves with peak-current potentials ($E_p$) at −40 and 0 mV. The reverse, cathodic trace, however, exhibits a single wave at $E_p$=−68 mV. Correcting for the pseudo-reference electrode potential (+89 mV) relative to Ag|AgCl (sat'd KCl), the potential over which AHBS undergoes faradaic reactions ($E_p$+20 to +90 mV) overlaps the region in FIG. 6C where AHBS retention is least sensitive to changes in $E_{app}$. These data indicate that AHBS, at these potentials, coexists in at least two interchanging chemical forms as it elutes from the EMLC column, which mitigates the responsiveness of k' to $E_{app}$. These observations underscore another attribute of EMLC as a separation tool: the use of electrochemical transformations as a means to further tune analyte retention.

In the foregoing specifications, specific embodiments of the present invention have been described. However, various modifications and changes, such as the chromatographic detector, the absolute position of the reference electrode (i.e., in a flow splitter or in-line with the stationary phase), or the presentation of the column itself (e.g., silica capillary, polymer tubing, channel fabricated in a glass substrate, etc.) can be made without departing from the scope of the present invention as set forth in the claims below. Accordingly, the specifications and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims, including any amendments made during the pendency of this application and all equivalents of those claims as issued.

What is claimed is:

1. An electrochemically modulated liquid chromatography (EMLC) column for separation of a sample, the EMLC column comprising:
   a conductive stationary phase packed in a capillary fluidic channel wherein the stationary phase functions as a working electrode in an electrochemical cell;
   a pseudo-reference electrode housing containing a dual-purpose reference or pseudo reference electrode which is current-carrying and which provides a stable reference potential that is not substantially perturbed by background current of the working electrode, wherein the EMLC column does not include a current-carrying counter electrode other than the dual-purpose reference or pseudo reference electrode; and
   a flow splitter connected to the capillary fluidic channel and to the pseudo-reference electrode housing to split a flow of liquid to the capillary fluidic channel and the pseudo-reference electrode housing.

2. The EMLC column of claim 1, wherein the capillary fluidic channel has an inner diameter of less than 250 µm.

3. The EMLC column of claim 1, wherein the working electrode has a background current of less than 1000 nA.

4. The EMLC column of claim 1, wherein fixed values of potentials or time-dependent potential waveforms are applied to the working electrode to manipulate the separation of the sample.

5. The EMLC column of claim 1, wherein fixed values of currents or time-dependent current waveforms are applied to the working electrode to manipulate the separation of the sample.

6. The EMLC column of claim 1, wherein the separation of the sample is manipulated by changes in solvent and/or electrolyte composition and concentrations of a mobile phase.

7. The EMLC column of claim 1, wherein the separation of the sample is manipulated by inducing an electrochemical transformation in one or more components in the sample.

8. The EMLC column of claim 1, wherein the stationary phase consists of a conductive material which includes but is not limited to reticulated vitreous carbon, boron-doped diamond, glassy carbon, porous graphitic carbon (PGC), stainless steels and other metals, semiconductors, and conductive and redox-active polymeric and inorganic materials.

9. The EMLC column of claim 1, wherein the cross-section of the capillary fluidic channel is circular, square, rectangular, or triangular shaped.

10. The EMLC column of claim 1, wherein the length of the capillary fluidic channel is from hundreds of microns to hundreds of centimeters.

11. The EMLC column of claim 1, wherein the column does not include an ion exchange membrane around the stationary phase.

12. The EMLC column of claim 1, further comprising a length of tubing connected downstream of the pseudo-reference electrode housing to provide flow resistance to achieve a desired flow rate through the capillary fluidic channel.

* * * * *